United States Patent [19]
Fujita et al.

[11] Patent Number: 4,637,540
[45] Date of Patent: Jan. 20, 1987

[54] METHOD AND APPARATUS FOR ASSEMBLING A STRUCTURE COMPOSING A VEHICLE'S BODY AND THE LIKE

[75] Inventors: Yoshitada Fujita, Kobe; Sadashi Hanada, Miki; Yoshiaki Yamamoto, Kobe, all of Japan

[73] Assignee: Kawasaki Jukogyo Kabushiki Kaisha, Kobe, Japan

[21] Appl. No.: 670,056

[22] Filed: Nov. 9, 1984

[30] Foreign Application Priority Data

Nov. 10, 1983 [JP] Japan .................................. 58-211276

[51] Int. Cl.$^4$ .............................................. B23Q 3/00
[52] U.S. Cl. ...................................... 228/49.2; 228/48; 29/559; 29/469; 269/289 MR
[58] Field of Search ................. 228/48, 49.2, 49.4; 269/289 MR; 29/559, 469

[56] References Cited

U.S. PATENT DOCUMENTS

| | | | |
|---|---|---|---|
| 1,801,140 | 4/1931 | Chapman | 228/49.2 |
| 2,366,961 | 1/1945 | Fine et al. | 29/155 R |
| 3,087,631 | 4/1963 | Kocher | 29/469 |
| 4,146,162 | 3/1979 | Skakunov | 228/48 |
| 4,479,602 | 10/1984 | Fernandez | 228/48 |

FOREIGN PATENT DOCUMENTS

| | | | |
|---|---|---|---|
| 0038245 | 3/1979 | Japan | 228/48 |
| 0130398 | 9/1980 | Japan | 228/48 |
| 2035873 | 6/1980 | United Kingdom | 228/48 |

*Primary Examiner*—Nicholas P. Godici
*Assistant Examiner*—C. McKee

[57] ABSTRACT

A method and apparatus for assembling a structure of rolling stock or other vehicles. The method includes: supporting the structure with a long box through fastening devices to a framework on the side of the structure, rotating the structure around an axis passing closely through the center of gravity of the structure and the long box, and bringing the structure to a halt in an arbitrary position to perform various assembly operations. The apparatus includes: a structure retaining system having a long box which supports the structure lengthwise; cylindrical shafts attached at both ends of the long box and passing through the center of gravity of the structure and the long box; rotational drive devices each having a drive mechanism for driving cylindrical rollers which support the cylindrical shafts on the retaining system; and a pedestal supporting the entire system.

3 Claims, 16 Drawing Figures

METHOD AND APPARATUS FOR ASSEMBLING A STRUCTURE COMPOSING A VEHICLE'S BODY AND THE LIKE

BACKGROUND OF THE INVENTION

This invention relates to a method and apparatus for assembling a structure composing of a vehicle body and the like, such as roof structure, side structure or end structure of a rolling stocks or other vehicles.

Common roof structures of rolling stocks comprise a roof framing which consists of carlings 1, stringers 2 and cant rails 3, and roof sheets 4 spread thereon, as shown in FIG. 1.

A typical conventional assembling method of vehicle roof structures thus arranged can be explained as follows:

Carlings 1 are placed on positioners previously spaced at given frame intervals on a jig, clamped with hand vises, and welded to stringers 2, thus making a one-piece roof framing. The integrated roof framing is removed from the jig, turned over with a crane and other handling devices, and placed on a stand for welding the back side of the framing to complete the assembly of the roof framing. After roof sheets 4 are placed upside down on a roof-sheet stand, the aforesaid framing is mounted on the roof sheets and tack welded to the sheets into one piece, which is tranferred to a welding stand to secure it. Then the framing and roof sheets are spot welded to complete this type of roof structure.

Finally the roof structure A is turned over with a crane or other handling devices and combined with side structures 10 and end structures 11, completing a vehicle's body as shown in FIG. 2.

In the course of the manufacturing process mentioned above, the roof structure A is turned over twice. The turnover operation is performed by slinging one side end of a roof structure with an overhead crane, lifting the end upright in a sling, two workers holding both ends of the roof structure, and by turning over the roof structure by crane operation along with manipulation by the two workers.

However, the aforesaid turn-over operation of a roof structure has the following problems:

(a) One or two overhead cranes are required for turning over a roof structure;

(b) The availability of overhead cranes may affect this work's efficiency because idle queueing time may take place if necessary cranes are being occupied with other jobs;

(c) A total of three or four men, that is one or two crane operators and two workers on the floor (including one who gives signals), is required;

(d) Turning over a roof structure needs a working area at least roughly twice that of the roof structure itself;

(e) Lift-up operation may cause deflections and scars on a roof structure, thus resulting in quality control problems;

(f) A roof structure consisting only of roof sheets and carlings without stringers, for instance, cannot be turned over because of the small resistance to deflection and torsion; and (g) In hoisting a roof structure with one overhead crane, the left and right sides of the roof structure may tend to hang unsynchronously poised because of the unbalance of the weight, thus causing safety problems.

SUMMARY OF THE INVENTION

To solve aforesaid drawbacks of the prior art gave rise to the present invention.

Thus it can be said that the purpose and objects of this invention is to provide the assembly work with labor- and time-saving, higher quality and enhanced safety.

To achieve aforesaid purpose, an assembly method according to this invention is characterized by supporting a structure by means of a long box through fastening devices which secure the long box to frameworks properly selected on one side of the structure, by rotating the structure around an axis passing closely through the resultant center of gravity of the said structure and the long box, and by bringing the structure to a halt in an arbitrary position to perform various assembly operations.

And an assembly apparatus according to the invention comprises a structure retaining system having a long box which supports a structure lengthwise over the length, and cylindrical shafts which are attached at both ends of the long box and whose center axis passes closely through the resultant center of gravity of said structure and the long box, as well as rotational drive devices each of which consists of a drive mechanism to drive cylindrical rollers which support the cylindrical shafts on said retaining system, and of a pedestal supporting the entire system.

The invention described above can not only reasonably settle the drawbacks of the conventional technology but also achieve the following effectiveness. Structures referred to here are not limited only to rolling stock roof structures, but can include rolling stock side and end structures composed of frameworks and shell plates, as well as other like structures.

(a) Time required for turning over is reduced remarkably.

(b) One-man operation can be effective to turn over structures.

(c) Turn-over operation without cranes eliminates idle queueing time and becomes stable for enhanced safety.

(d) Turning-over operation causes no deflections and scars on a structure, thus creating high quality.

(e) Easy rotation can be provided due to small torque requirement, because the center of rotation is at or near the resultant center of gravity of a structure to be turned over and the structure retaining system.

(f) Inching operation other than turning-over can also be easily achieved.

(g) Structures without longitudinal members such as stringers which are less resistant to deflection and torsion can be safely applied to the apparatus for assembly.

DETAILED DESCRIPTION OF THE PREFERRED EMBODIMENT

The following drawings explain embodiments of the invention for methods and apparatus for assembling roof structures of vehicle bodies.

Figure 1:
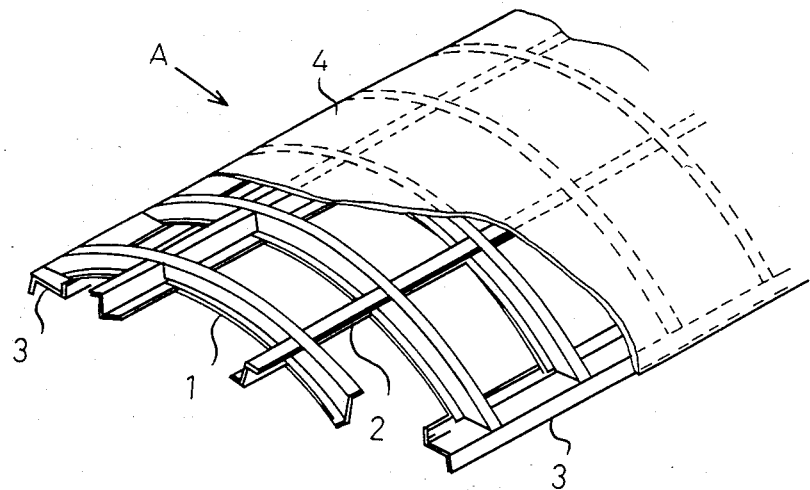
FIG. 1 is a perspective view illustrating a typical construction of rolling stock roof structures.
Figure 2:
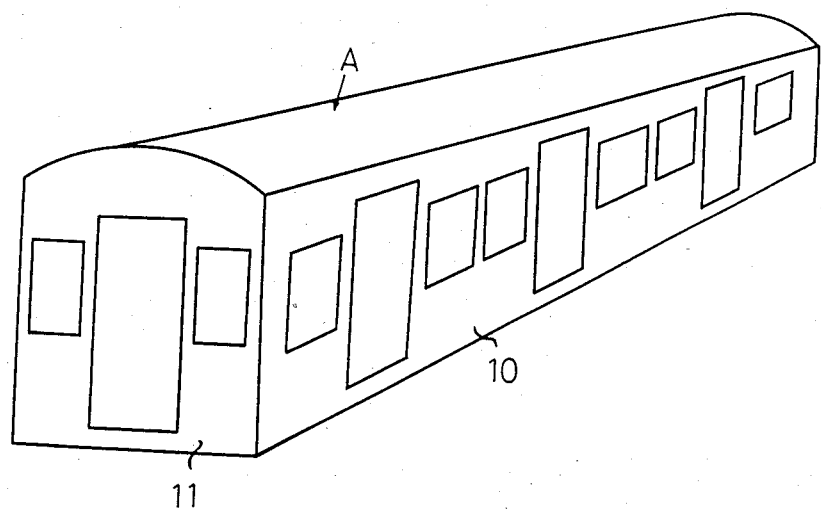
FIG. 2 is a perspective view illustrating a typical rolling stock body.
Figure 3:
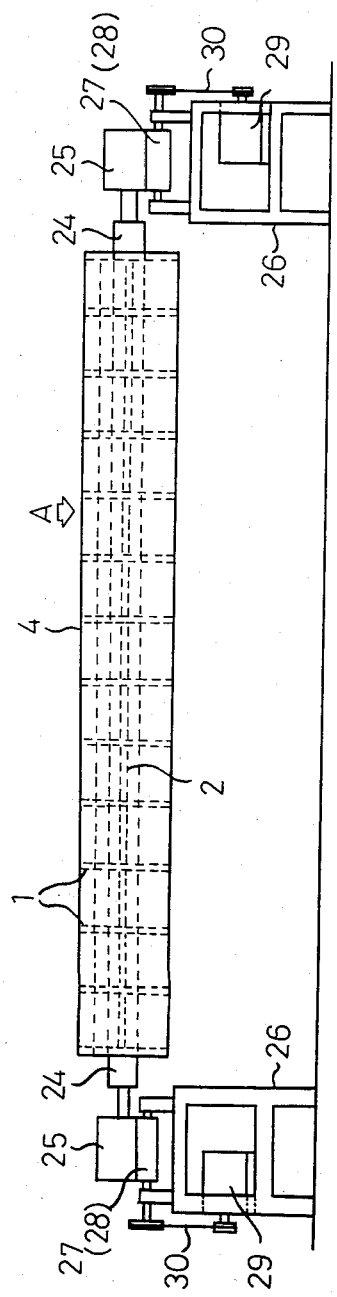
FIG. 3 is a front view showing a rolling stock roof structure mounted on an apparatus according to the invention.
Figure 4:
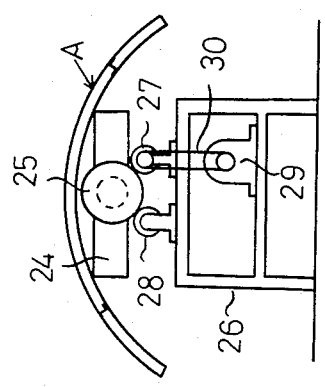
FIG. 4 is a side view of the above roof structure.

FIGS. 3 and 4 are respectively a front and side view of an apparatus according to the invention, showing a roof structure A constructed as shown in FIG. 1 which has been set and turned over on the apparatus. Cant rails are omitted in the drawings for clarity. A roof framing without roof sheets spread thereon can also be set and turned over on the apparatus.

In FIGS. 3 and 4, 24 is a long box, and 25 are cylindrical shafts, attached to both ends of said long box, which carry the long box 24 and a roof structure A and can turn them over. The cylindrical shafts are so attached to both ends of the long box that the axis of rotation of the cylindrical shafts 25 passes closely through the resultant center of gravity of a roof structure A and the long box 24, which allows for smaller torque to turn over the roof structure with small powered drive devices. Provision is made on the surface of the shafts so as not to cause a slip during turnover. 26 are pedestals, on each top of which one pair of left and right cylindrical rollers 27 and 28 are mounted to support said cylindrical shafts 25. These cylindrical rollers 27 and 28 are mounted parallel to the axis of the cylindrical shafts 25 and also properly spaced so that the cylindrical shafts 25 may not jump out of contact with the cylindrical rollers 27 and 28. The cylindrical rollers 27 and 28 are provided with rubber lining on the circumferential surface so that no slip may occur between the cylindrical shafts 25 during turnover. The cylindrical rollers 27 are directly driven through chains or belts 30 by drive devices 29 mounted on said pedestals 26, and the other cylindrical rollers 28 are their followers used only for supporting and guiding the cylindrical shafts 25. Said drive devices are to rotate a roof structure A and the long box 24 as one piece, using small-powered miniature motors which are properly reduced in speed so that a roof structure can rotate safely. The location of the center of rotation, or more specifically that of both cylindrical shafts, being at or near the resultant center of gravity enables manual rotation instead of by motors if desirable.

Furthermore, said drive devices 29 as shown in an embodiment (see FIG. 3) are located on pedestals 26 at both ends and also activated simultaneously by one switch operation to prevent a roof structure A from being twisted, as well as are so designed that a roof structure A can be brought to a positive stop at a desired position by the brakes in the motors. Only one-side drive may enough and safe, if resistance to torsion and deflection of either a roof structure A or the long box 24 is strong enough. In addition, said pedestals 26 are of box-type construction which can carry the entire system, and are designed to be so high that a roof structure A can clear any possible obstacles during turnover.

Figure 5:
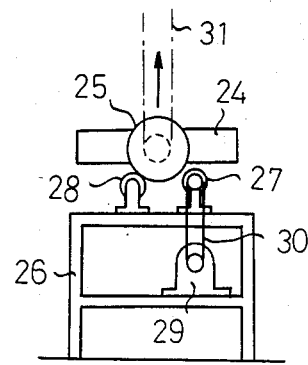
FIGS. 5 to 8 are side views illustrating in sequence how to load a roof structure on an apparatus according to the invention.
Figure 6:
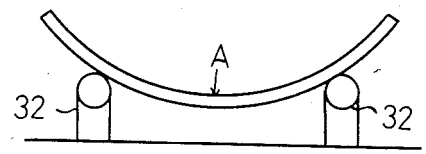
Figure 7:
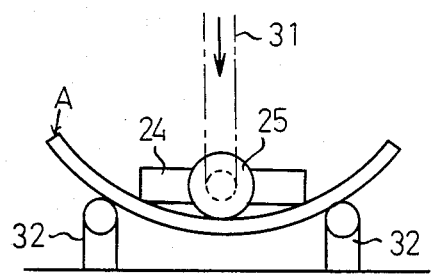
Figure 8:
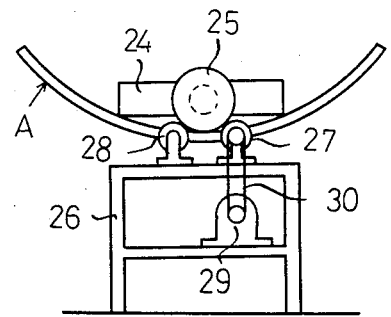

FIGS. 5 to 8 show the sequence in which a roof structure A is set on the apparatus. FIG. 5 shows the status of the apparatus when a roof structure is not yet set. At first a roof structure A is placed on a cradle 32 as shown in FIG. 6. Next, the long box 24 on a main component of a retaining system B described later is slung with a crane 31 and placed as shown in FIG. 7 on the roof structure which has been set on the cradle, to be fastened to the roof structure-A with retainers described later (see FIGS. 9 to 11). Again, a combination of the roof structure A and the long box 24 is lifted with crane 31 and, as shown in FIG. 8, is placed on the cylindrical rollers 27 and 28 on the said pedestals 26 so that the cylindrical shafts 25 at both ends of the long box 24 are fit into the rollers to complete preparations for turnover operation. Actuating a power switch of the drive device at this condition will start a turnover operation.

Figure 9:
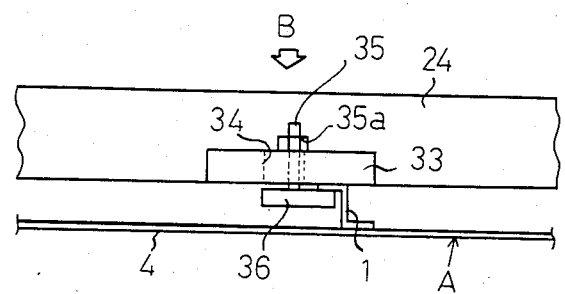
FIGS. 9 to 11 are respectively a general front, plan, and side view explaining how a roof structure is connected on a structure retaining system of an apparatus according to the invention.
Figure 10:
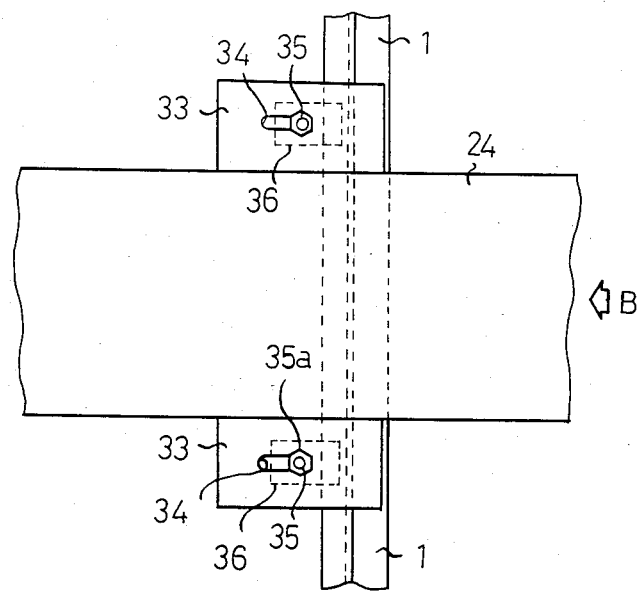
Figure 11:
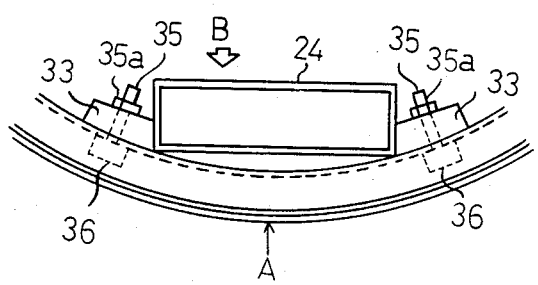
Figure 12:
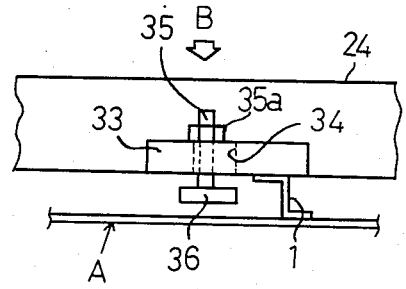
FIG. 12 is a general front view explaining how the connection between said retaining system and a roof structure is released.
Figure 13:
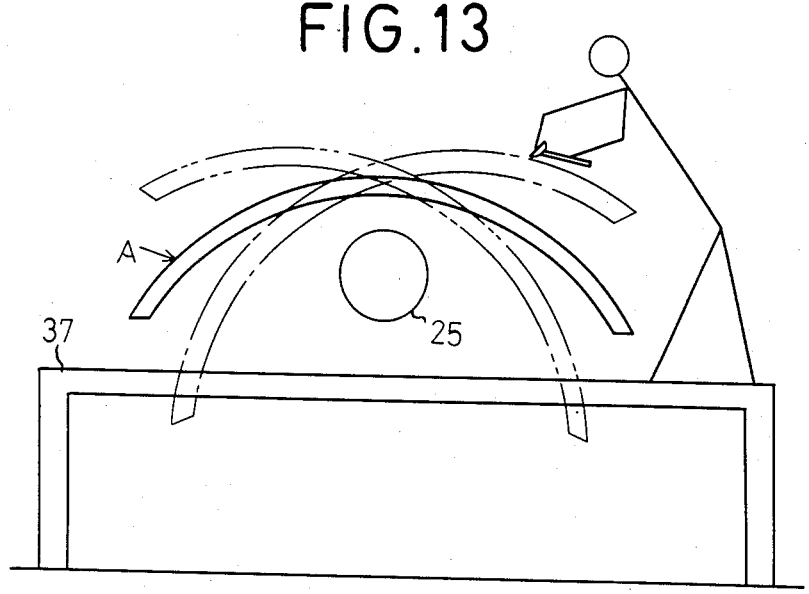
FIGS. 13 and 14 are respectively a side view and an end view explaining how to inch a structure with an apparatus according to the invention.
Figure 14:
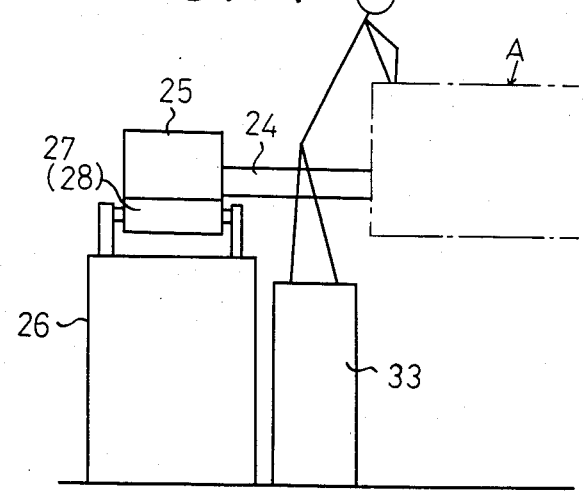

Now FIGS. 9 to 11 show one example of retaining devices attached to the long box 24. 33 are retaining plates for retainers 36 placed at several positions required on the sides of the long box 24. In one retaining plate 33 a guide slit 34 is cut parallel to the longitudinal direction of the long box 24. In this guide slit a retaining bolt 35 is inserted to secure the retainer 36 at the bottom, while the bolt can slide along the box in the slit. Pushing the retainer against the web of the carling 1 and tightening the retaining bolt 35 with nut 35a will clamp the web of the carling 1 between the retaining plate 33 and the retainer 36, thus connecting the long box 24 indirectly to a roof structure A as one piece. FIG. 12 shows the status when the nut 35a is backed off, the retainer 36 is slid away to the left on the drawing, and a roof structure A is released from the long box 24. As explained above, a structure retaining system B is composed of a long box 24, cylindrical shafts 25, retaining plates 33, guide slits 34, retaining bolts 35 and retainers 36.

In addition, an apparatus according to the invention is not only used for turnover operation of said roof structures, but also can properly be utilized for work at the ends of a roof structure. For example, an application of corrugated stainless steel sheets to the roof sheets of stainless steel rolling stock will require a process where roof sheets are soldered to carlings for waterproofing. This soldering work necessitates inching of the work to keep the flat position because softening solder will drop off before it adheres if the surface of the work piece to be soldered is not horizontal. This apparatus enables the work piece to be easily inched to a desired position, so that the soldering operation can be readily performed on a work stand.

Figure 15:
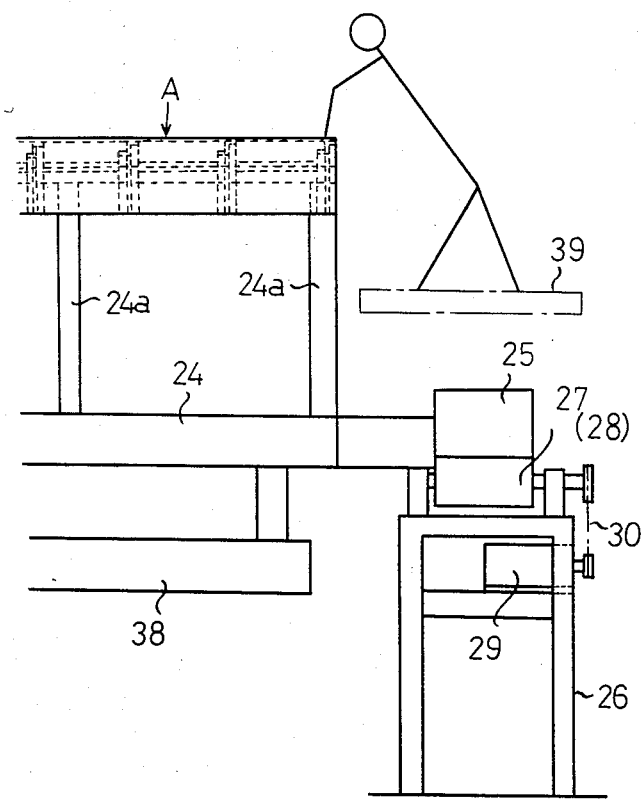
FIG. 15 is a partial front view of an apparatus to apply a method as another embodiment of the invention.
Figure 16:
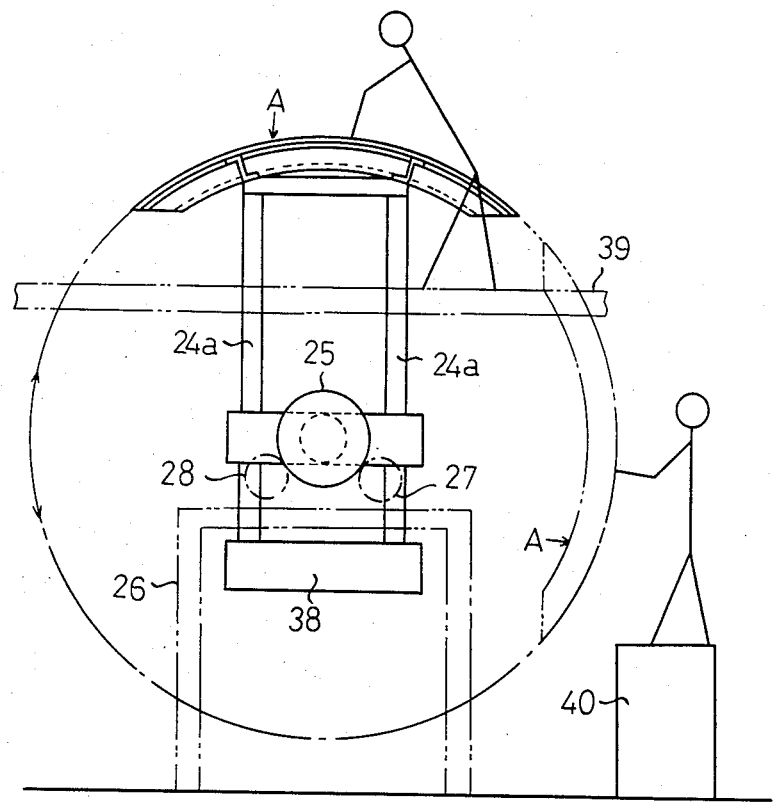
FIG. 16 is a side view of the above apparatus.

Furthermore, some additional operations other than the turnover operation stated above are possible. FIGS. 15 and 16 show an alternate operation and its apparatus where provisions of a retaining frame 24a on one side of the long box 24 and of a balance weight 38 on the other side enable the entire system to be well balanced as a roof structure A is set, and also the outside circular surface of a roof structure A to be rotated closely around the center of the roof circle. This apparatus enables the operator to perform said soldering operations without shifting his position on a scaffold, all he has to do is move a workpiece to be turned (such as a roof structure) a distance required. In securing pieces to be attached on the outside surface of a roof structure by welding or with rivets or bolts, a rotation of the roof structure to the vertical position enables the operator to work sideways on the extensive area of the roof structure in a relaxed position without moving on a scaffold 40.

What is claimed is:

1. A method of assembling an elongated structure having a longitudinal axis, comprising the steps of: connecting an elongated box to said structure so that the longitudinal axis of said box extends parallel to and on one side the longitudinal axis of said structure; connecting an elongated balance weight to said elongated box parallel to and on the opposite side of said longitudinal axis of said structure; providing rotatable shaft for the combination of the structure, the elongated box, and the balance weight at longitudinally spaced, opposite ends of said box so that the shafts coincides with the center of gravity of the combination of said structure, elongated box, and balance weight; placing said rotatable shafts with said combination upon at least two pair of driven rollers wherein said rotatable shafts are rotatably retained by gravity on said rollers rotating the structure, elongated box, and balance weight and stopping rotation of the combination of said structure, elongated box and balance weight in desired angular positions to perform assembly operations.

2. A method according to claim 1, wherein the outside surface of the structure transverse to the longitudinal axis of the structure is a circular arc, and wherein the structure is so connected to the elongated box that the center of curvature of said arc essentially coincides with the center of gravity of the combination of the structure, elongated box, and balance weight.

3. An apparatus for assembling an elongated structure, such as a roof of a vehicle body, comprising: a retaining system for the stucture, including an elongated box having a pair of cylindrical shafts at opposite longitudinal ends of said box, and means for supporting the structure essentially parallel to said shafts about the exterior of said elongated box; an elongated adjustable balance weight attached to said elongated box so as to extend essentially parallel to said elongated box on an opposite side of said cylindrical shafts so that the center of gravity of the combination of said elongated box, said balance weight, and the structure essentially coincides with said cylindrical shafts, a pair of cylindrical rollers for rotatably supporting said cylindrical shafts, means for driving said cylindrical rollers, and pedestal means for supporting said shaft and cylindrical rollers, the elongated box, balance weight, and cylindrical shafts assembly being maintained on said rollers by gravity, and readily removeable from said rollers for attachment and disattachment of said structure from said elongated box by lifting said assembly from said cylindrical rollers.

* * * * *